E. H. CLUTTER.
COMPUTING SCALE.
APPLICATION FILED MAR. 26, 1912.

1,066,583.

Patented July 8, 1913.
2 SHEETS—SHEET 1.

Witnesses:
Christ Feinle, Jr.,
John J. McCarthy

Inventor
E. H. Clutter.
By Victor J. Evans,
Attorney.

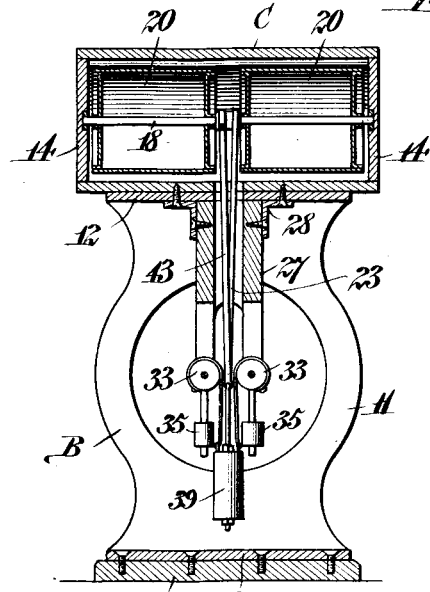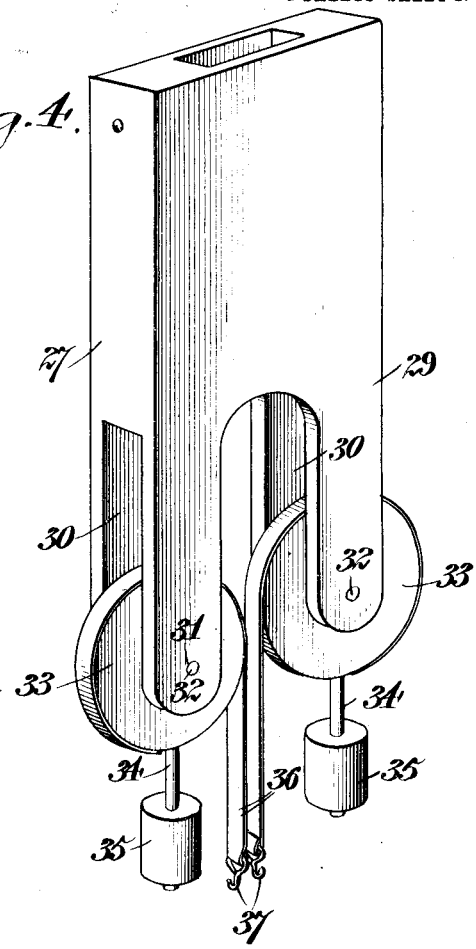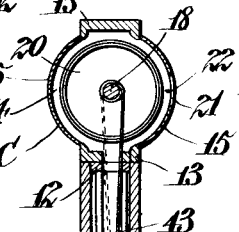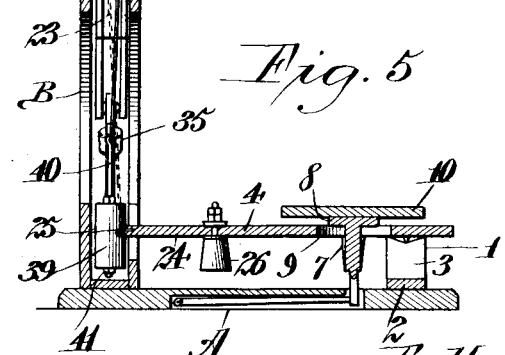

UNITED STATES PATENT OFFICE.

ELMER H. CLUTTER, OF INNISFREE, ALBERTA, CANADA.

COMPUTING-SCALE.

1,066,583.  Specification of Letters Patent.  Patented July 8, 1913.

Application filed March 26, 1912. Serial No. 686,435.

*To all whom it may concern:*

Be it known that I, ELMER H. CLUTTER, a subject of the King of Great Britain, residing at Innisfree, in the Province of Alberta and Dominion of Canada, have invented new and useful Improvements in Computing-Scales, of which the following is a specification.

My present invention relates to improvements in computing scales and has particular application to weighing or balancing mechanisms for such scales.

In carrying out this invention, it is my purpose to provide a scale of this type wherein by means of a plurality of weighted elements, the weight of the load may be determined, certain of such elements counteracting the remaining elements so that a correct reading may be obtained from the indicating means upon the application of a load to the scales.

It is also my purpose to provide a scale of this character wherein a load receiving platform may be actuated under the action of a load to impart movement to an indicating means through the medium of a weighing or balancing mechanism constructed in such manner as to enable a correct reading to be obtained from the indicating means.

The invention also involves a weighing or balancing mechanism composed in the present instance, of a plurality of power weights and a balancing weight, and means connecting the power weights to the balancing weight so that the latter may be gradually relieved of the influence of the former weights under the action of the load receiving platform, the power weights assisting the platform in elevating the balancing weight to actuate the indicating means in order to determine the weight of the load, the balancing weight being relieved of the power of the power weights so that the load on the platform and the balancing weight may counterbalance each other to indicate on the indicating means the specific gravity of the load.

With the above and other objects in view, the invention consists in the construction, combination and arrangement of parts hereinafter set forth in and falling within the scope of the appended claims.

Figure 1:
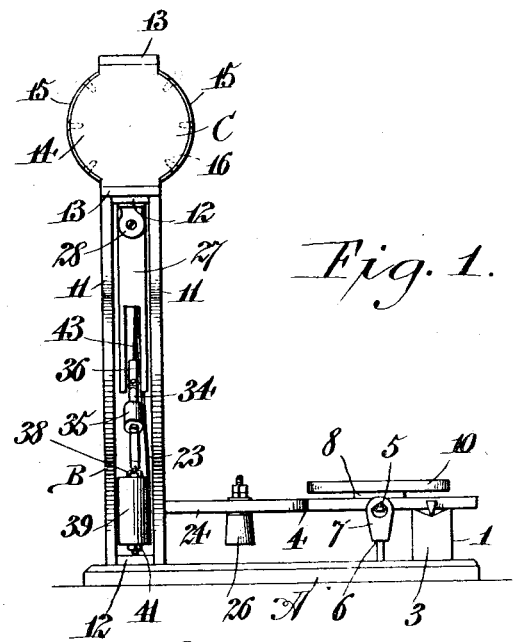
Figure 2:
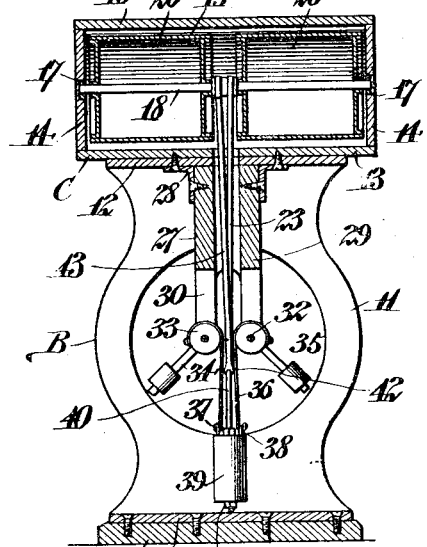

In the accompanying drawings forming a part of this specification and wherein has been illustrated the preferred form of my invention; Figure 1 is a side elevation of a scale embodying the present invention. Fig. 2 is a central vertical section through the vertical portion of the scale showing the parts in their normal positions. Fig. 3 is a view similar to Fig. 2 illustrating the parts in their actuated positions. Fig. 4 is an enlarged detail view of the balancing mechanism and its support, removed from the scale, and Fig. 5 is a vertical sectional view taken at right angles to Fig. 2.

Similar reference characters designate like parts throughout the several views.

Referring now to the accompanying drawings in detail, the scale, in the present instance, is shown to be of the oscillating drum type, comprising a horizontal base A, a vertical standard B and a drum housing or casing C fixed upon the upper end of the standard. Fixed upon the end of the base A opposite from the standard, is a stationary bearing 1 consisting of a cross piece 2 fastened to the base in any suitable manner and provided at its opposite end with upstanding bearing posts 3. Pivoted in these bearing posts, upon knife edge bearings or the like, is what may be termed a weighing platform 4 equipped upon its opposite sides with trunnions 5, which may be of the knife edge type, arranged beyond the bearing posts 3 with respect to the forward end of the scale. Mounted upon these trunnions 5 is a hanger 6 equipped at its opposite ends with bearing brackets 7 which engage the trunnions 5 and hold the hanger suspended from the weighing platform. At a suitable point between the brackets 7, preferably centrally, the hanger 6 is provided with an upstanding block 8 which projects through an opening 9 in the platform 4. Securely fastened to the block 8 above the weighing platform and spaced from the latter by means of such block, is a load receiving platform 10. From this construction it will be seen that the load receiving platform maintains a horizontal position at all times, irrespective of the position of the base A and while I have shown and described one form of balancing mechanism for the load receiving platform, it is to be understood that I do not limit myself to the specific construction and arrangement of parts just described.

The standard B which is secured to the rear end of the base relative to the load receiving platform consists of, preferably, though not necessarily, a pair of spaced parallel plates 11, 11 connected at their upper and lower ends by means of cross pieces 12, 12, the lower one of which is adapted to receive bolts or other suitable fastening devices so that the standard may be rigidly secured to the base, while the upper of such pieces has securely fastened thereto the housing or casing C, the latter, in this instance, consisting of the top and bottom bars 13, 13 and substantially circular side walls 14, 14, a cover composed of the segmental sections 15, 15 being fastened to the side walls 14, 14 upon the opposite sides of the cross pieces 12, 12 by means of screws 16, or the like. Mounted in the side walls 14, 14 are alining bearings 17, 17 in which is journaled a shaft 18 carrying an indicating drum 19 herein shown as comprising the two drum sections 20, 20 spaced from each other upon the shaft and arranged at the opposite sides of the transverse center line thereof. Upon these drum sections are numerals indicating weights and total values, or other suitable indicia, such data being readable through slots 21 formed in the segmental sections of the housing, the wire 22 or similar indicator being arranged within such slots to obtain a correct reading from the drum in the movement of the latter under the action of the load receiving platform.

The drum sections 20, 20 and shaft 18 are, in the present embodiment of my invention, subject to an oscillatory movement and to receive such movement, the drum shaft is connected by means of a flexible connection 23 with the weighing platform 4, the latter being provided with a rearwardly extending arm 24 carrying a hook 25 designed to receive the lower extremity of the flexible connection 23, the upper extremity of such connection being fastened to the central part of the drum shaft intermediate the drum sections. A weight 26 is fastened to the arm 24 to maintain the parts in their normal positions, when no load is upon the platform.

In order to actuate the indicating drum from the load receiving platform so that a proper reading may be obtained therefrom in the application of a load to such platform, I have provided a weighing or balancing mechanism disposed intermediate the indicating means and the load receiving platform and adapted to be operated from the latter. This mechanism is supported by means of a yoke 27 pivotally mounted in brackets 28 depending from the lower side of the upper cross piece 12 of the standard so that the mechanism may hang true or plumb irrespective of the position of the base. The opposite arms 29, 29 of the yoke have their free end portions bifurcated as at 30 and provided with alining openings 31 adapted to receive pivot pins 32 upon which are mounted disks 33, each carrying a radial arm 34 equipped at its free end with a weight 35, the weights being threaded onto or otherwise suitably secured to the arms. These weights 35 will be termed hereinafter power weights, and to the disk 33 of each weight is fastened one end of a flexible element 36 such as a metallic ribbon, band or the like, which element is trained over a portion of the periphery of its respective disk and terminates in a hook 37 designed to engage a staple or the like 38 carried by a weight 39 which latter weight may be termed a balance weight. Passing through an aperture in the balance weight, is a rod 40 having threaded onto its lower end a nut 41 and terminating at its upper end in a hook 42 designed to receive one end of a flexible connection 43, the opposite end of which is secured to the drum shaft 19 at a point substantially diametrically opposite to the connection between the flexible connection 23 and such shaft, the flexible connections 23 and 43 serving to rotate or oscillate the shaft in relatively reverse directions.

The operation of the balancing mechanism just described may be briefly stated as follows: When a load is placed upon the load receiving platform, the latter through the medium of the weighing platform and arm 24 exerts a downward pull upon the flexible connection 23, thereby imparting movement to the drum shaft to rotate the drums and bring the proper figures into registration with the slots in the side walls of the housing C and the indicator in such slots so that a reading may be obtained from the drum to ascertain the weight of the load. In the downward movement of the flexible connection 23, the similar connection 43 is drawn upwardly, owing to the movement of the shaft and its connection therewith, and carries with it the balance weight 39, the power weights 35 assisting the weighing platform to elevate the balance weight. As the power weights near their center of gravity, the balance weight is gradually relieved of the influence or force of such weight and when the power weights reach their center of gravity, the balance weight is entirely free from the effect of the former, thereby enabling the weight 39 to balance the weight of the load on the platform. By means of nut 41, the balance weight may be adjusted to take up any inequalities in the mechanism.

While I have herein shown and described one form of my invention, by way of illustration, I desire to have it understood that I do not confine myself to all of the details of construction herein set forth, as modification and variation may be made within the scope of the appended claims and without departing from the spirit of my invention.

I claim:

1. The combination with a load receiving platform, and indicating means, of a balancing mechanism between the platform and means, said mechanism comprising a plurality of power weights, and a balancing weight, and means connecting the first-mentioned weights to the balancing weight, whereby the latter may be gradually relieved of the influence of the power weights under the action of the load receiving platform, and means for holding said balancing mechanism plumb.

2. The combination with a load receiving platform, and indicating means, of a balancing mechanism between the platform and means, said mechanism comprising a yoke, a pair of disks pivoted in said yoke, arms radiating from said disks, power weights upon said arms, and a balance weight, connections between said balance weight and the first-mentioned weights and between the balance weight and indicating means, and a connection between the indicating means and load receiving platform.

In testimony whereof I affix my signature in presence of two witnesses.

ELMER H. CLUTTER.

Witnesses:
WILSON M. SLOCOMB,
D. J. DICKSON.